(12) United States Patent
Takahashi (10) Patent No.: US 7,295,382 B2
(45) Date of Patent: Nov. 13, 2007

(54) IMAGE PICKUP DEVICE AND METHOD OF CONTROLLING A LENS UNIT

(75) Inventor: Taizo Takahashi, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 82 days.

(21) Appl. No.: 11/105,869

(22) Filed: Apr. 13, 2005

(65) Prior Publication Data

US 2005/0231824 A1    Oct. 20, 2005

(30) Foreign Application Priority Data

Apr. 20, 2004  (JP) ............................. 2004-124393

(51) Int. Cl.
 G02B 15/14  (2006.01)
 G02B 7/02   (2006.01)
 G02B 9/00   (2006.01)

(52) U.S. Cl. ....................... 359/694; 359/695; 359/696; 359/822; 359/739

(58) Field of Classification Search ........ 359/694–696, 359/823, 824, 826, 697, 698, 819, 822, 703, 359/738, 739
See application file for complete search history.

(56) References Cited

FOREIGN PATENT DOCUMENTS

JP    07-295050 A    11/1995
JP    2003-121720 A    4/2003

*Primary Examiner*—Ricky Mack
*Assistant Examiner*—Jack Dinh
(74) *Attorney, Agent, or Firm*—Frishauf, Holtz, Goodman & Chick, P.C.

(57) ABSTRACT

An image pickup device includes a collapsible lens barrel which is held in a main body of the device in non-picture-taking mode, and a shutter unit which is arranged behind a rearmost one of a plurality of optical lenses that make up the lens barrel and which includes a unit base member having an opening. A plurality of shutter blades are attached to the unit base member, and opened and closed by electromagnetic driving. A first state where when the lens barrel is collapsed, the shutter blades are full-opened and at least part of the optical lenses is located in the opening of the unit base member and a second state where when the lens barrel is projected from the main body of the device, the shutter blades are closed and then opened and closed at required shutter speed are selectively switched to each other.

6 Claims, 7 Drawing Sheets

PICTURE-TAKING MODE
(SECOND STATE)

COLLAPSED MODE
(FIRST STATE)

FIG.4A
PICTURE-TAKING MODE
(SECOND STATE)

FIG.4B
COLLAPSED MODE
(FIRST STATE)

FIG.5

FIG.6A
PICTURE-TAKING MODE
(SECOND STATE)

FIG.6B
COLLAPSED MODE
(FIRST STATE)

FIG. 7A
PICTURE-TAKING MODE
(SECOND STATE)

FIG. 7B
COLLAPSED MODE
(FIRST STATE)

PRIOR ART
FIG. 8A
PICTURE-TAKING MODE

PRIOR ART
FIG. 8B
COLLAPSED MODE

IMAGE PICKUP DEVICE AND METHOD OF CONTROLLING A LENS UNIT

CROSS-REFERENCE TO RELATED APPLICATIONS

This application is based upon and claims the benefit of priority from prior Japanese Patent Application No. 2004-124393, filed Apr. 20, 2004, the entire contents of which are incorporated herein by reference.

BACKGROUND OF THE INVENTION

1. Field of the Invention

The present invention relates to an image pickup device having a collapsible lens unit and a method of controlling the lens unit.

2. Description of the Related Art

Conventionally, a collapsible camera in which a lens barrel is held in the camera body in non-picture-taking mode has widely been used as a compact camera that gives high priority to portability, regardless of whether it is a camera using a silver-salt film (referred to as a silver-salt camera hereinafter) or a digital camera that captures an image as electronic data.

Figure 8A:
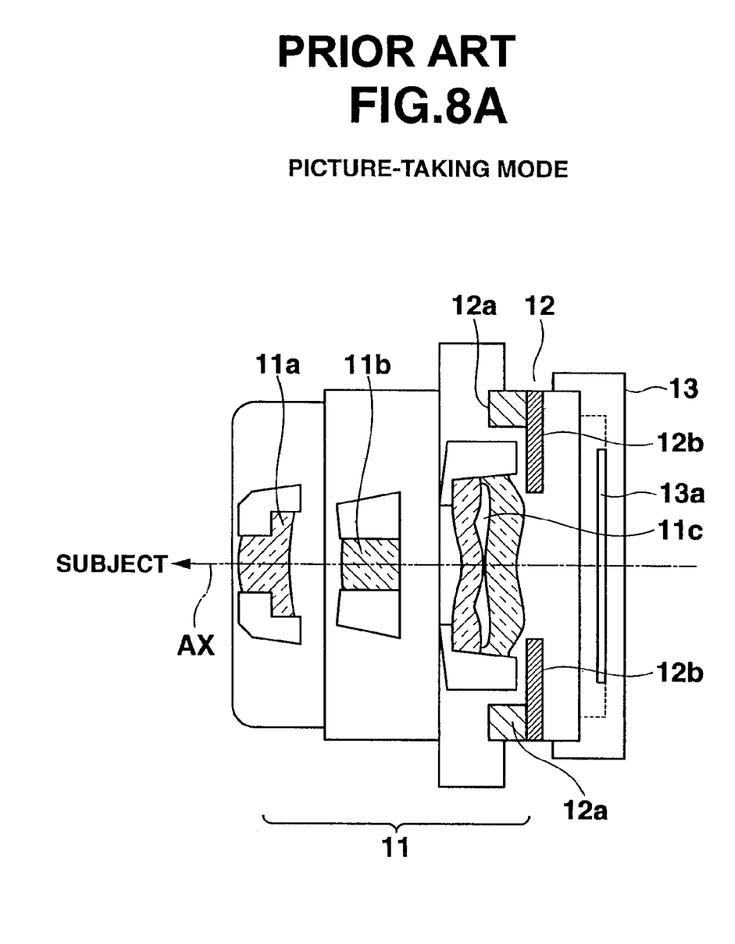
FIGS. 8A and 8B are sectional views showing a configuration of a prior art collapsible lens unit of a behind-shutter type.
Figure 8B:
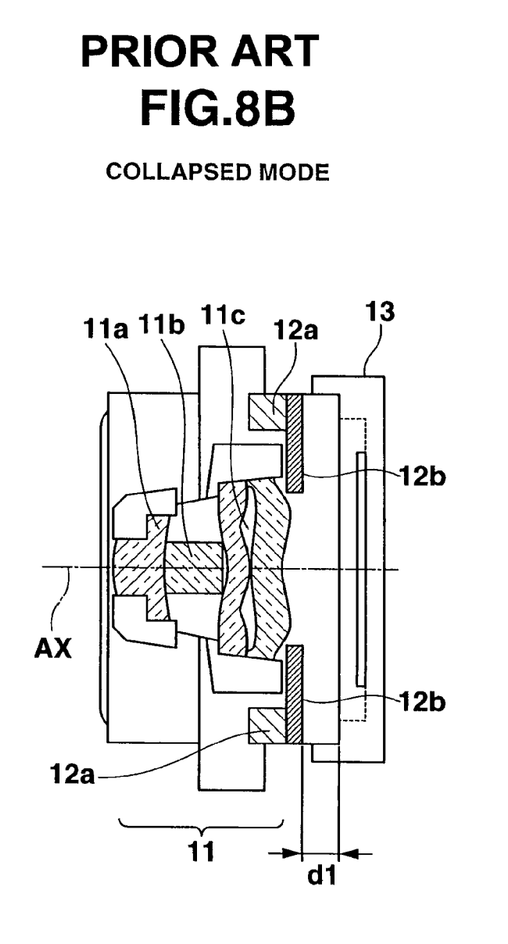

FIGS. 8A and 8B illustrate a collapsible lens unit of a behind-shutter type in which a shutter is located behind a lens system. FIG. 8A shows a relationship in location among an optical lens, a shutter unit and a CCD serving as an image pickup element in picture-taking mode where the lens system is projected. FIG. 8B shows the relationship in collapsed mode where the lens system is collapsed.

An optical lens 11 is made up of one first-group lens 11a, one second-group lens 11b and two third-group lenses 11c arranged in this order from a subject. A shutter unit 12 is provided behind the optical lens system 11.

The shutter unit 12 includes ring-shaped unit base members 12a each having a circular opening. A plurality of semi-circular shutter blades 12b are attached to the unit base members 12a, respectively. The opening/closing of the shutter blades 12b is controlled by an electromagnetic mechanism (not shown). A CCD package 13 is mounted in a given position behind the shutter unit 12 along the picture-taking optical axis AX of the unit 12.

The CCD package 13 includes a CCD 13a serving as an image pickup element. The CCD 13a is fixed on an image-forming plane of the optical lens system 11 with the shutter unit 12 therebetween.

In the collapsed mode shown in FIG. 8B, the first-group to third-group lenses 11a to 11c of the optical lens system 11 are arranged along the picture-taking optical axis AX such that they are close to each other with almost no gap therebetween. The entire lens barrel including the optical lens system 11 can be decreased in length more than that in the picture-taking mode shown in FIG. 8A. Assume here that the optical lens system 11 can be held in the camera body (not shown).

In FIG. 8B, d1 indicates the width of dead space in the direction of the picture-taking optical axis AX. This dead space is a portion in which the lens barrel cannot be collapsed because the shutter unit 12 is fixedly mounted on the CCD package 13.

Jpn. Pat. Appln. KOKAI Publication No. 2003-121720 discloses a lens shutter of not a behind-shutter type but a between-shutter type in which a shutter unit is arranged between lenses. When a lens barrel is collapsed, shutter blades are opened larger and part of the lenses is inserted into the opening of the shutter blades. The lens barrel is thus decreased in length in the optical axis direction, with the result that the device can be thinned when the lens barrel is collapsed.

The lens unit shown in FIGS. 8A and 8B causes the following drawback. Since the shutter unit 12 is fixedly mounted on the CCD package 13 as described above, dead space that does not contribute to the collapse in the direction of the optical axis occurs and the body of the device cannot be thinned.

The between-shutter type lens shutter of the above Publication has to be configured to have such a large opening as to receive part of lenses. Considering that the lens shutter is of a between-shutter type, the lens barrel can be shortened in the optical axis direction when it is collapsed, but it increases in size in the radial direction, with the result that the entire device cannot be downsized.

Since, moreover, the opening of the shutter blades is large, the range in which the shutter blades can be moved extends, and a high shutter speed, which is the feature of the lens shutter, becomes difficult to achieve.

BRIEF SUMMARY OF THE INVENTION

According to a first aspect of the present invention, there is provided an image pickup device comprising a collapsible lens barrel which is held in a main body of the device in non-picture-taking mode, a shutter unit which is arranged behind a rearmost one of a plurality of optical lenses that make up the lens barrel and which includes a unit base member having an opening, a plurality of shutter blades being attached to the unit base member, and opened and closed by electromagnetic driving, and a shutter control unit which selectively switches between a first state and a second state, the first state corresponding to a state where when the lens barrel is collapsed, the shutter blades are full-opened and at least part of the optical lenses is located in the opening of the unit base member, and the second state corresponding to a state where when the lens barrel is projected from the main body of the device, the shutter blades are closed and then opened and closed at required shutter speed.

According to a second aspect of the present invention, there is provided a method of controlling a lens unit of an image pickup device including a collapsible lens barrel which is held in a main body of the device in non-picture-taking mode, a shutter unit which is arranged behind a rearmost one of a plurality of optical lenses that make up the lens barrel and which includes a unit base member having an opening, a plurality of shutter blades being attached to the unit base member, and opened and closed by electromagnetic driving, the method comprising selectively switching between a first state and a second state, the first state corresponding to a state where when the lens barrel is collapsed, the shutter blades are full-opened and at least part of the optical lenses is located in the opening of the unit base member, and the second state corresponding to a state where when the lens barrel is projected from the main body of the device, the shutter blades are closed and then opened and closed at required shutter speed.

According to a third aspect of the present invention, there is provided an image pickup device comprising a collapsible lens barrel held in a main body of the device in one of power-off mode and playback mode, the lens barrel being made up of a plurality of optical lenses, a shutter unit which opens and closes a plurality of shutter blades arranged between the optical lenses and an image pickup element, and a shutter control unit which causes the shutter unit to open the shutter blades larger in collapsed mode than in picture-taking mode and which causes part of the optical lenses to be inserted into an opening of the shutter blades.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A digital camera according to an embodiment of the present invention will be described with reference to the accompanying drawings.

Figure 1:
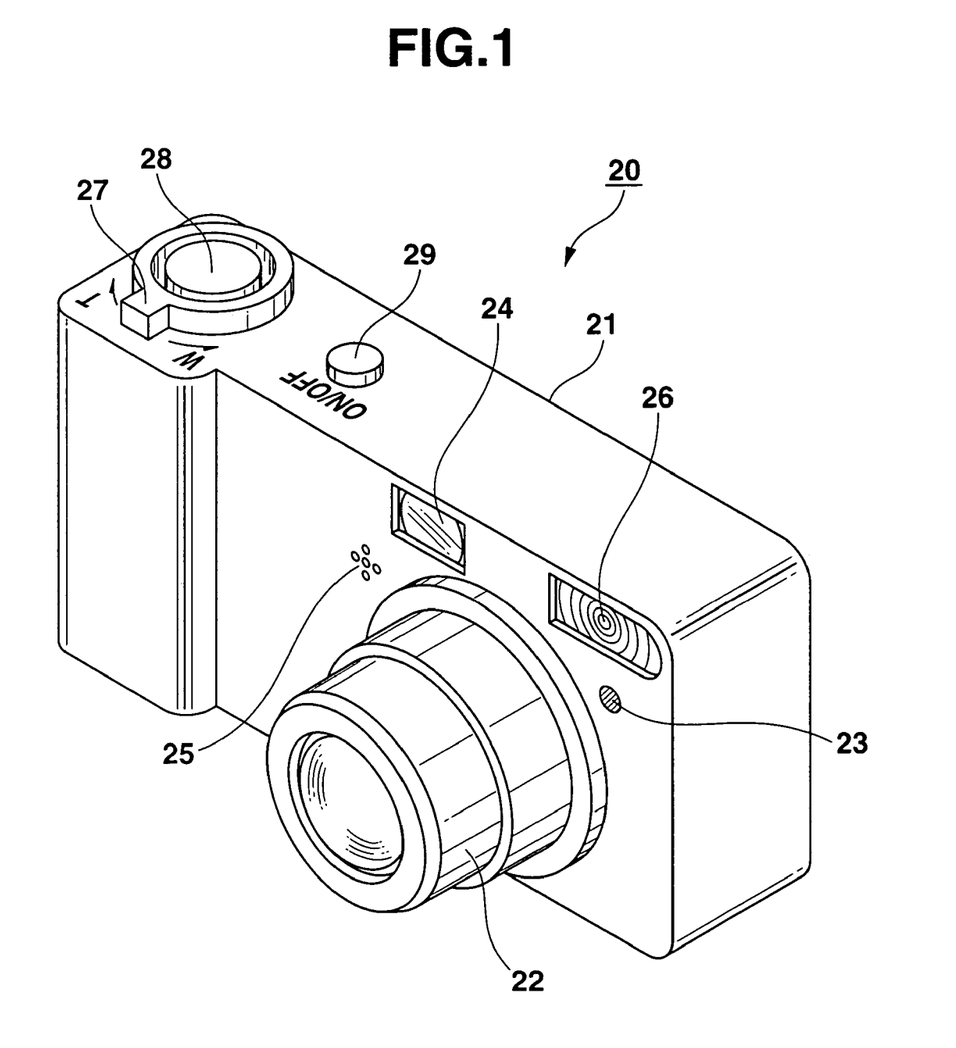
FIG. 1 is a perspective view showing an outward appearance of a digital camera according to an embodiment of the present invention.

FIG. 1 shows an outward appearance of a digital camera 20, especially the front and top of the camera.

The digital camera 20 includes a lens barrel 22, a self-timer lamp 23, an optical finder window 24, a microphone unit 25 and a strobe light emitting unit 26 on the front of an almost rectangular metal exterior body 21. It also includes a zoom lever 27, a shutter key 28 and a power key 29 on the right end of the top of the body 21 (when viewed from a user).

The lens barrel 22 has an AF function and an optical zoom function for varying a focal length in a stepless manner. The lens barrel 22 collapses into the body 21 in power-off mode and playback mode.

The zoom lever 27 is a lever-shaped member that is formed integrally with a ring around the shutter key 28 and protruded toward the front of the camera. The zoom lever 27 is used to give instructions to zoom in (telephoto T) and zoom out (wide-angle W) with the zoom function in picture-taking mode. The shutter key 28 is used to indicate picture-taking timing in picture-taking mode.

The power key 29 is used to turn on/off a power supply.

Though not shown in FIG. 1, the digital camera 20 includes a mode switch, a speaker unit, a menu key, a cross key, a set key, an optical finder, a strobe charge pump, a display unit, etc. on the back of the body 21.

Though not shown in FIG. 1, either, the camera 20 also includes on its bottom a memory card slot for attaching/detaching a memory card used as a recording medium and a serial interface connector for connecting the camera 20 with an external personal computer and the like, such as a universal serial bus (USB) connector.

Figure 2:
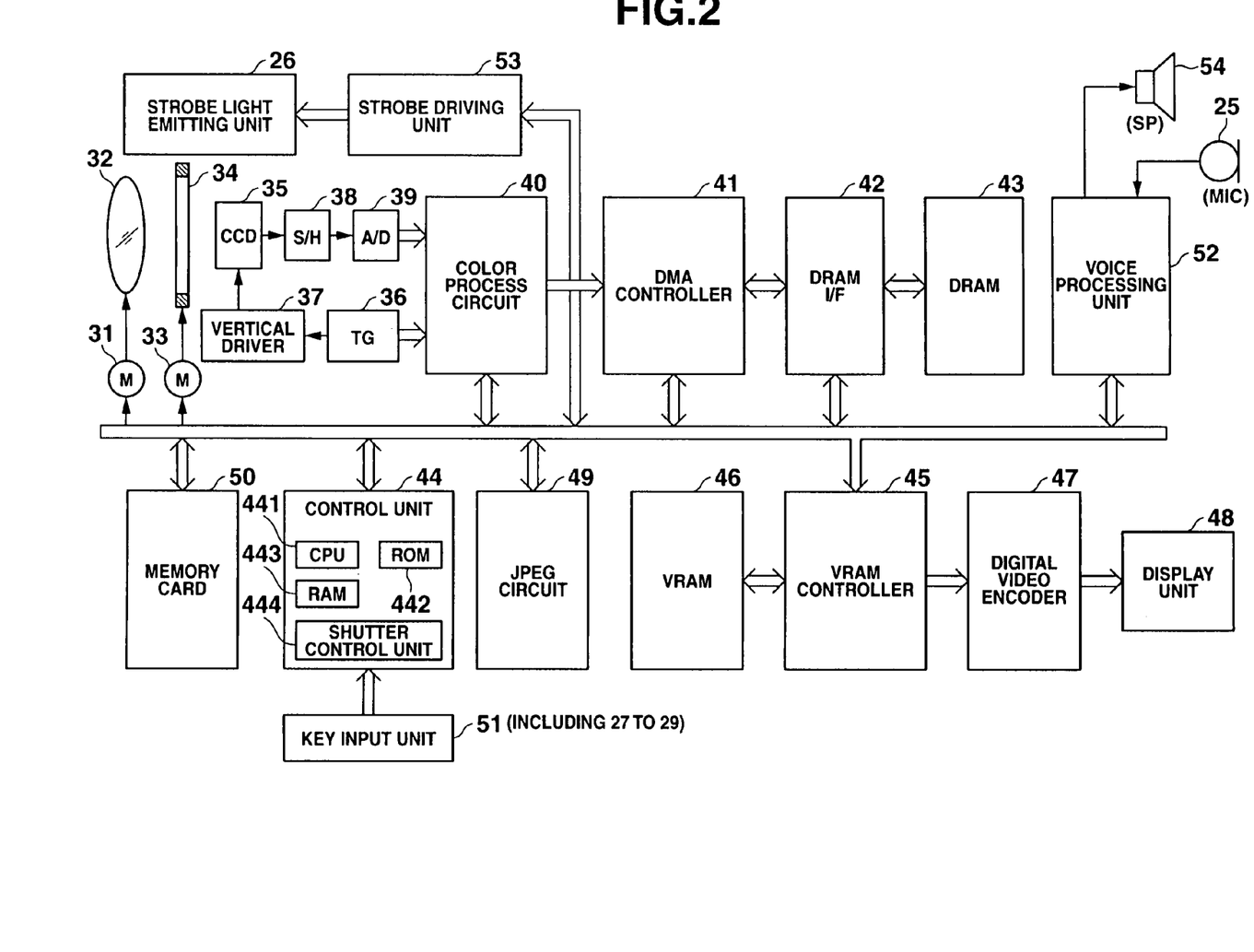
FIG. 2 is a block diagram showing functions of an electronic circuit of the digital camera according to the embodiment of the present invention.

The functions of an electronic circuit of the above digital camera 20 will be described with reference to FIG. 2.

In still-picture taking mode, a motor (M) 31 is driven to move a lens optical system 32 that constitutes a picture-taking lens in the lens barrel 22. The zoom, focus and aperture (not shown) positions can thus be varied.

A CCD 35 serving as an image pickup device is provided behind the lens optical system 32 on its picture-taking optical axis with a shutter unit 34 therebetween. The shutter unit 34 is opened and closed by the motor (M) 33. The CCD 35 forms an optical image through the lens optical system 32.

The CCD 35 is driven by a timing generator (TG) 36 and a vertical driver 37 to output a photoelectric conversion signal corresponding to an optical image formed at a constant frame rate, e.g., every thirty frames per second for one screen in a monitor display state that does not require the operation of the shutter key 28.

The photoelectric conversion signal, which is an analog signal, is gain-controlled appropriately for each of primary colors of R, G and B and then sampleheld by a sample-hold (S/H) circuit 38. An AD converter 39 converts the data into digital data, and a color process circuit 40 subjects the digital data to a color process including pixel interpolation and gamma ($\gamma$) correction to generate a digital brightness signal Y and color-difference signals Cb and Cr. These signals are supplied to a direct memory access (DMA) controller 41.

The DMA controller 41 writes the signals Y, Cb and Cr to a buffer therein once using a composite sync signal, a memory write enable signal and a clock signal which are supplied from the color process circuit 40. Then, the DMA controller 41 transfers the written signals by DMA to a DRAM 43 used as a buffer memory through a DRAM interface (I/F) 42.

A control unit 44 includes a CPU 441, a shutter control unit 444 for opening and closing the shutter unit 34 in accordance with the collapsed state of the lens barrel 22, a ROM 442 that fixedly stores operating programs to be executed by the CPU, and a RAM 443 used as a work memory. The control unit 44 plays a role in the entire control of the digital camera 20.

The control unit 44 reads the brightness and color-difference signals out of the DRAM 43 through the DRAM interface 42 and writes them to a VRAM 46 through a VRAM controller 45.

A digital video encoder 47 regularly reads the brightness and color-difference signals out of the VRAM 46 through the VRAM controller 45, and generates video signals based on these signals and supplies them to the display unit 48.

The display unit 48 is provided on the back of the digital camera 20 as described above. In picture-taking mode, the display unit 48 functions as a monitor display unit (electronic finder) to display data corresponding to the video signals from the digital video encoder 47. An image corresponding to image information received from the VRAM controller 45 is therefore displayed in real time.

If the shutter key 28 is operated with timing for taking a still picture in a so-called through-image display state where the display unit 48 displays the image as a monitor image in real time, a trigger signal is generated.

In response to the trigger signal, the control unit 44 stops the DMA transfer of the brightness and color-difference signals for one screen, which are received from the CCD 35, to the DRAM 43. The control unit 44 drives the CCD 35 again with an f number and at a shutter speed, which conform to proper exposure conditions to generate brightness and color-difference signals for one screen and transfer it to the DRAM 43. After that, this route is blocked to bring the signal into a recording and saving state.

In this recording and saving state, the control unit 44 reads the one-frame brightness and color-difference signals in units of basic block of eight pixels×eight pixels for each of components of signals Y, Cb and Cr through the DRAM interface 42 and writes them to a joint photograph coding experts group (JPEG) circuit 49. The JPEG circuit 49 compresses the signals by adaptive discrete cosine transform (ADCT), Huffman coding of an entropy coding type, or the like.

The compressed signals are read out of the JPEG circuit 49 as a data file for one image and written to a memory card 50 that is detachable to the digital camera 20 as a recording medium.

As the above compressed signals are all written to the memory card 50, the control unit 44 starts up the route from the CCD 35 to the DRAM 43 again.

A key input unit 51, a voice processing unit 52 and a strobe driving unit 53 are connected to the control unit 44.

The key input unit 51 includes the above-described zoom lever 27, shutter key 28, power key 29, mode switch, menu key, cross key and set key. As these keys are operated, the signals are directly sent to the control unit 44.

The voice processing unit 52 has a sound source circuit such as a PCM sound source. In voice recording mode, the unit 52 converts a voice signal supplied from the microphone unit (MIC) 25 into digital data. The unit 52 compresses the digital data in accordance with a given data file format such as MP3 (MPEG-1 audio layer 3) into a voice data file and sends it to the memory card 50. In voice playback mode, the unit 52 decompresses the voice data file sent from the memory card 50 into analog data and drives the speaker (SP) unit 54, which is provided on the back of the digital camera 20 described above, to sound the analog data loudly.

The strobe driving unit 53 charges a large-capacity capacitor for strobe (not shown) in still-picture taking mode and drives the strobe light emitting unit 26 under the control of the control unit 44.

In not a still-picture taking mode but a moving-picture taking mode, when the shutter key 28 is depressed first, the operations of acquiring still-picture data, compressing the data by the JPEG circuit 49, and recording the compressed data into the memory card 50 are performed in sequence at an appropriate frame rate, e.g., every thirty frames per second. If the shutter key 28 is depressed for a second time or a given time limit of, e.g., thirty seconds elapses, a series of still-picture data files is reset together as a data file (AVI file) of a motion JPEG.

In playback mode, the control unit 44 selectively reads image data out of the memory card 50 and expands the compressed image data by the procedure opposite to those by which data is compressed in picture-taking mode in the JPEG circuit 49. The expanded image data is held by the DRAM 43 through the DRAM interface 42. The contents of the data held in the DRAM 43 are stored in the VRAM 46 through the VRAM controller 45. The control unit 44 regularly reads image data out of the VRAM 46 to generate a video signal and plays it on the display unit 48.

If not a still picture but a moving picture is selected as picture data, the still-picture data items that constitute a file of the selected moving picture are continuously played back. When the last still-picture data item is played back, a still-picture data item at the head is played back and displayed until the next instruction to play back a still-picture data item is given.

An operation of the digital camera according to the embodiment of the present invention will be described.

The following processes are performed in still-picture taking mode based on the programs that are fixedly stored in advance chiefly by the control unit 44.

The shutter key 28 is depressed through a two-stage stroke operation. It performs a first-stage stroke operation as a basic one, which is generally called "semi-depression" for performing AF and AE operations to lock focusing and exposing conditions, and a second-stage stroke operation, which is generally called "full depression" for taking a picture under the above conditions.

Figure 3:
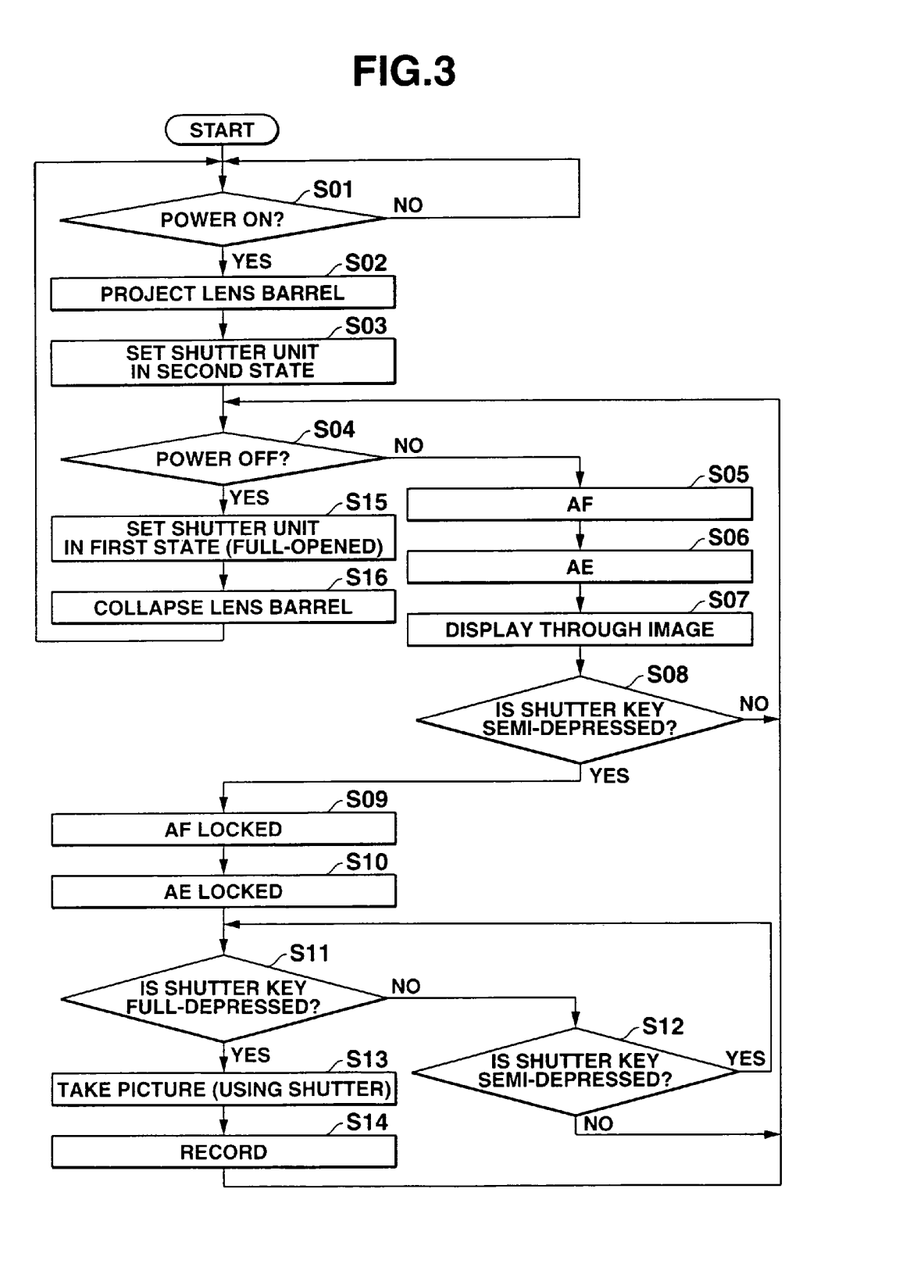
FIG. 3 is a flowchart showing a process including an operation to move a lens barrel and a shutter unit in picture-taking mode in the digital camera according to the embodiment of the present invention.

FIG. 3 shows a process performed when the digital camera turns on by the power key 29 and moves into a still-picture taking mode. At the beginning of the process, the control unit 44 stands by for the power key 29 to operate (step S01). When the power key 29 is operated, the motor 31 is driven to project the collapsed lens barrel 22 and move it to a picture-taking position-(step S02). The lens optical system 32 is driven to move the shutter blades of the full-opened shutter unit 34 to a given opening position for picture taking (step S03).

Figure 4A:
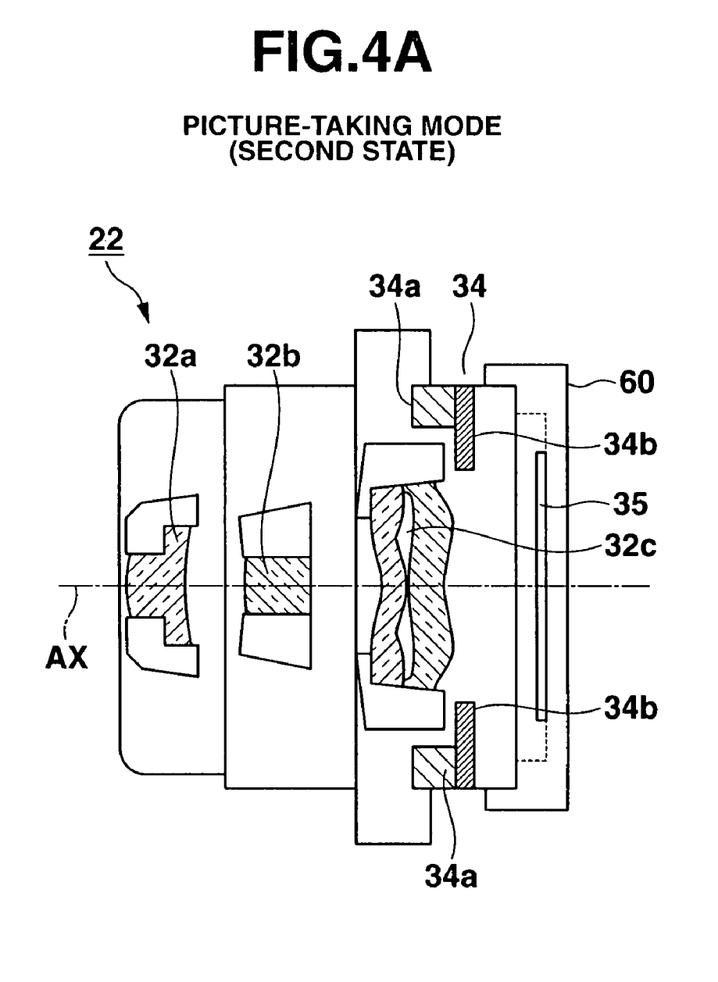
FIGS. 4A and 4B are sectional views illustrating an arrangement of a lens barrel, a shutter unit and a CCD package in the digital camera according to the embodiment of the present invention.

FIG. 4A illustrates an arrangement of the lens optical system 32 that constitutes the lens barrel 22 in the picture-taking mode (second state), the shutter unit 34 and a CCD package 60 including the CCD 35.

As illustrated in FIG. 4A, the lens optical system 32 is made up of one first-group lens 32a, one second-group lens 32b and two third-group lenses 32c, which are arranged in this order from a subject. The shutter unit 34 is provided behind the system 32.

The shutter unit 34 includes a ring-shaped unit base member 34a having a circular opening and a plurality of semi-circular shutter blades 34b. These shutter blades 34b are attached to the unit base member 34a, and opened and closed by an electromagnetic mechanism (not shown) such as a stepping motor. The CCD package 60 is provided in a given position behind the shutter unit 34 and along the picture-taking optical axis AX of the shutter unit 34.

In the picture-taking position, the shutter unit 34 is opened slightly smaller than the frame body of the rearmost third lenses 32c of the lens optical system 32 in such a manner that it can be opened and closed at required shutter speed. Naturally, the rearmost ends of the third lenses 32c are located slightly in front of the opened shutter blades 34b on the picture-taking optical axis AX.

Even though the shutter blades 34b are full-closed by the shutter operation, the third lenses 32 do not physically interfere with the shutter operation at all.

In the above picture-taking mode, the control unit 44 determines whether the digital camera turns off or not by operating the power key 29 again (step S04). If the power key 29 is not operated, AF and AE operations are performed with the focal length corresponding to a zoom position of the selected lens optical system 32 to obtain a focus position and set a suitable focus condition and obtain a suitable exposure value and set an aperture value and a shutter speed (steps S05 and S06).

If the shutter speed corresponds to the frame rate of, e.g., thirty frames per second in monitoring state, it is adjusted to be considerably higher than one-thirtieth second to acquire image data from the CCD 35 and display a through image on the display unit 48 (step S07). The control unit 44 determines whether the shutter key 28 of the key input unit 51 is semi-depressed (step S08). These processes are repeated to stand by for the power key 29 to operate and for the shutter key 9 to be semi-depressed.

If the control unit 44 determines that the shutter key 28 is semi-depressed in step S08, the focus position obtained by the AF operation in step S05 is locked (step S09) and so are the aperture value and shutter speed obtained from the suitable exposure value by the AE operation (step S10).

While the above picture-taking conditions are locked, the control unit 44 repeatedly determines whether the shutter key 28 is full-depressed or not (step S11) and it is semi-depressed or not (step S12). The control unit 44 therefore stands by for the shutter key 28 to be full-depressed while confirming that it is semi-depressed.

If the control unit 44 determines in step S12 that the semi-depression of the shutter key 28 is released, it unlocks the above picture-taking conditions and returns to the step S04.

If the control unit 44 determines in step S11 that the shutter key 28 is full-depressed while the picture-taking conditions are locked, a picture is taken to acquire image data with the picture-taking conditions locked (step S13).

At this time, the shutter unit 34 is so controlled that its shutter blades 34*b* are full-closed in accordance with the completion timing of exposure. A smear can thus be prevented reliably from being generated from the CCD 35 when an intensive light source is provided on the subject side.

After that, the acquired image data is quickly recorded and stored in the memory card 50 as a file (step S14). A series of processes described above ends and the control unit 44 returns to the step S04 to get ready for the next picture taking.

When the control unit 44 determines in step S04 that the power key 29 is operated to give an instruction to turn off the digital camera, the shutter unit 34 is set in the first state in which their shutter blades 34*b* are full-opened to get ready for the collapse of the lens barrel 22 (step S15). The control unit 44 collapses the lens barrel 22 (step S16) and returns to step S01 to stand by for the power key 29 next.

Figure 4B:
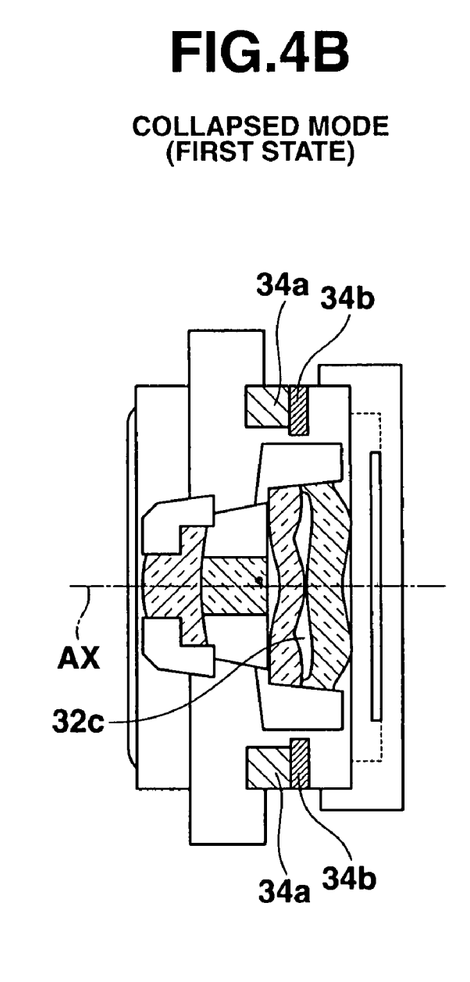

FIG. 4B illustrates an arrangement of the lens optical system 32 that constitutes the lens barrel 22 in the collapsed mode (first state), the shutter unit 34 and the CCD package 60.

In the first state, the shutter unit 34 is not opened or closed for picture taking, but their shutter blades 34*b* are opened the largest. The rearmost third lenses 32*c* of the system 32, including at least its frame body, are completely inserted into the opening of the shutter blades 34*b*.

Figure 5:
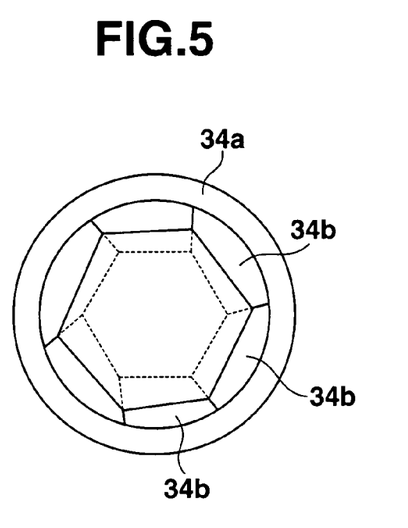
FIG. 5 is a chart showing only the shutter unit in a first state in the digital camera according to the embodiment of the present invention.

FIG. 5 illustrates the unit base member 34*a* of the shutter unit 34 and the full-opened shutter blades 34*b* thereof in the first state. In FIG. 5, the shutter blades 34*b* are opened much larger than those in the second state indicated by the broken line.

In the first state where the lens barrel 22 is collapsed into the body 21, the behind-type shutter unit 34 is located behind the lens barrel 22 on the optical axis and their shutter blades 34*b* are full-opened. At least part of the lens optical system 32 is located in the opening of the shutter blades.

Even though the shutter unit 34 is fixedly mounted on the CCD package 60, there is no dead space into which the lens barrel 22 cannot be collapsed and thus the lens barrel 22 can decrease in length in the optical axis direction without increasing in diameter.

In the second state where the lens barrel 22 is projected to take a picture, the shutter blades 34*b* are closed and the shutter unit 34 is opened and closed at required shutter speed. Accordingly, the shutter speed can be increased.

In the foregoing embodiment, the unit base member 34*a* of the shutter unit 34 is fixed and only the shutter blades 34*b* thereof are opened and closed. However, the unit base member 34*a*, which is a frame body to which the shutter blades 34*b* are attached, can be divided when the need arises. This configuration will be described as another example of the shutter unit 34.

Figure 6A:
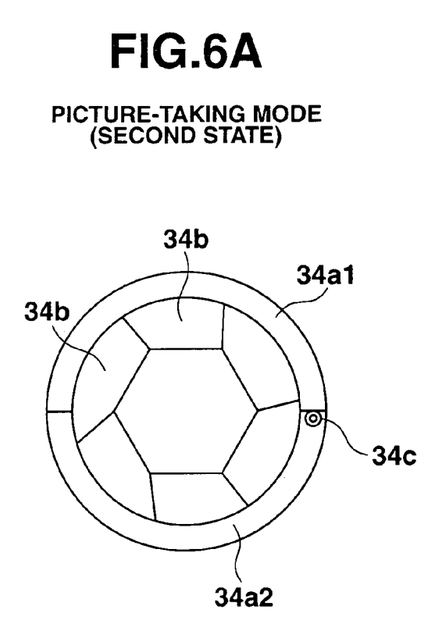
FIGS. 6A and 6B are charts showing another configuration of the shutter unit of the digital camera according to the embodiment of the present invention.
Figure 6B:
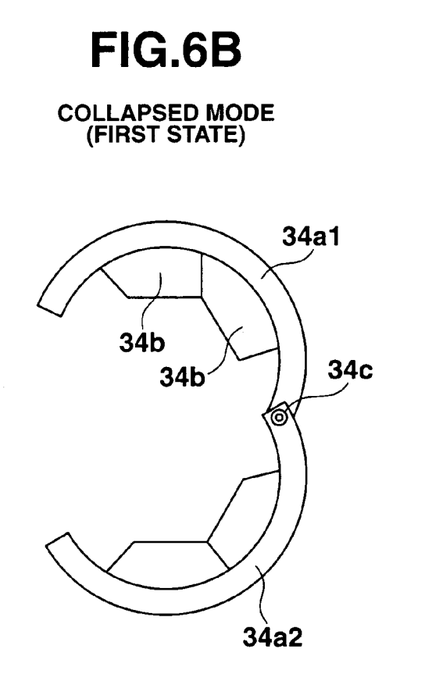

FIG. 6A illustrates the shutter blades 34*b* that are opened the largest in the second state where the lens barrel 22 is projected to take a picture. FIG. 6B illustrates the shutter blades 34*b* that are opened the largest in the first state where the lens barrel 22 is collapsed.

As is apparent from FIGS. 6A and 6B, the unit base member 34*a* is divided into two unit base members 34*a*1 and 34*a*2 by a hinge mechanism 34*c*. The shutter blades 34*b* attached to the unit base members 34*a*1 and 34*a*2 do not vary in their opening positions.

Figure 7A:
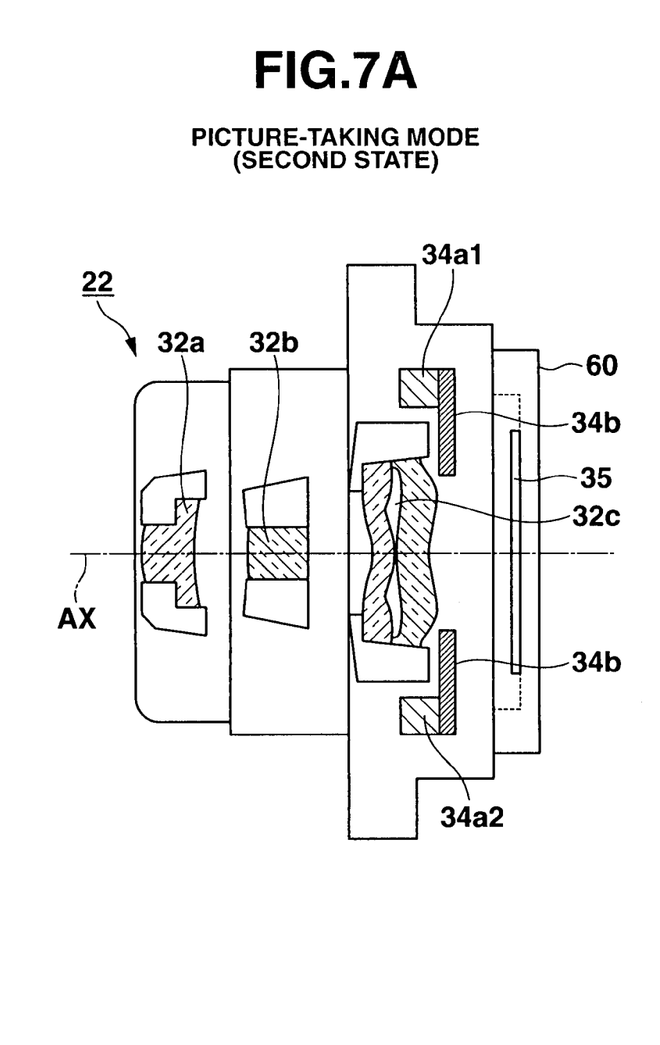
FIGS. 7A and 7B are sectional views illustrating another arrangement of a lens barrel, a shutter unit and a CCD package in the digital camera according to the embodiment of the present invention.

FIG. 7A illustrates an arrangement of the lens optical system 32 that constitutes the lens barrel 22 in the picture-taking mode (second state), the shutter unit 34 and the CCD package 60 including the CCD 35.

In the second state shown in FIG. 7A, the unit base members 34*a*1 and 34*a*2 of the shutter unit 34 are shaped like a ring as also shown in FIG. 6A, and the shutter blades 34*b* are located behind the rearmost third lenses that constitute the lens optical system 32.

Figure 7B:
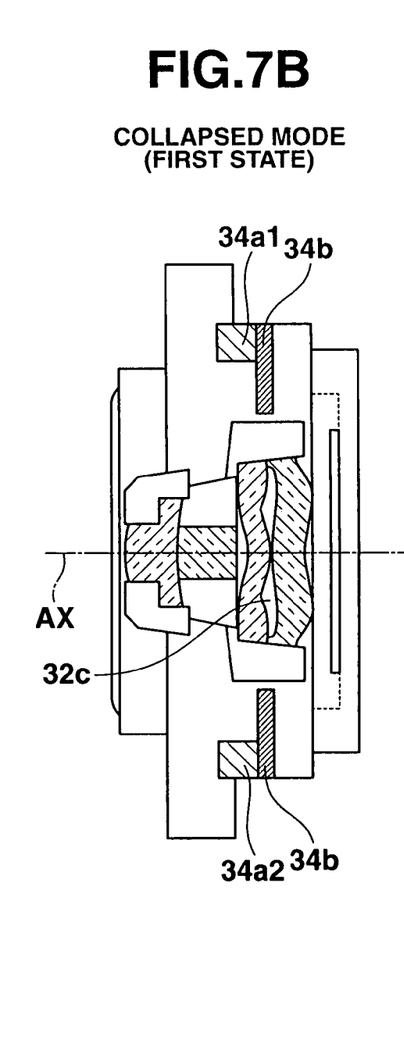

In the collapsed mode (first state) shown in FIG. 7B, the unit base member 34*a* is divided into two members 34*a*1 and 34*a*2 and opened by the hinge mechanism 34*c* as shown in FIG. 6B. In this state, naturally, the shutter blades 34*b* cannot be opened or closed for picture taking, but the rearmost third lenses 32*c*, including at least its frame body, are completely inserted into the opening of the shutter blades.

As described above, the unit base member 34*a* to which the shutter blades 34*b* are attached can be divided. The opening can thus be enlarged without varying the angles at which the shutter blades 34*b* are attached, and the shutter blades 34*b* need not be opened or closed in two stages, thereby making the configuration more simply.

In the above embodiment, a still picture is taken by the digital camera. The present invention is not limited to this, but can be applied to any camera apparatus having a collapsible lens barrel and a behind-type lens shutter and a method for controlling the camera apparatus, regardless of whether a picture to be taken is a still one or a moving one and whether the camera is a digital one or a silver-salt camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup device comprising:
a collapsible lens barrel which is held in a main body of the image pickup device in a non-picture-taking mode, said lens barrel including a plurality of optical lenses;
a shutter unit which is arranged behind a rearmost one of the plurality of optical lenses of the lens barrel, said shutter unit including a unit base member having an opening and a plurality of shutter blades that are attached to the unit base member and that are opened and closed by electromagnetic driving;
a first shutter control unit which controls the shutter blades to be in a first state when the lens barrel is collapsed such that the shutter blades are opened and at least part of at least one of the optical lenses is inserted in the opening of the unit base member; and
a second shutter control unit which, when the lens barrel is projected from the main body of the image pickup device, controls the shutter blades to be on standby in a second state such that the shutter blades are moved to be partially closed so as to be opened by a smaller amount than in the first state, and then controls the shutter blades to further close from the second state in reply to an instruction for starting a picture taking operation.

2. The image pickup device according to claim 1, wherein the unit base member of the shutter unit comprises a plurality of unit base member elements, and wherein in the first state the shutter blades are opened and the unit base member is divided into the plurality of unit base member elements to enlarge the opening, and in the second state the unit base member elements are united into the unit base member.

3. The image pickup device according to claim 2, wherein in the first state the unit base member is divided into two by a hinge mechanism included in the unit base member.

4. The image pickup device according to claim 1, wherein the optical lenses of the lens barrel include a first-group lens, a second-group lens and a third-group lens arranged to extend from the main body of the image pickup device.

5. The image pickup device according to claim 1, wherein the unit base member of the shutter unit is ring-shaped and has a circular opening, and the shutter blades are semicircular.

6. A method of controlling a lens unit of an image pickup device, wherein the image pickup device comprises: (i) a collapsible lens barrel which is held in a main body of the image pickup device in a non-picture-taking mode, said lens barrel including a plurality of optical lenses, and (ii) a shutter unit which is arranged behind a rearmost one of the plurality of optical lenses of the lens barrel, said shutter unit including a unit base member having an opening and a plurality of shutter blades that are attached to the unit base member and that are opened and closed by electromagnetic driving, the method comprising:

controlling the shutter blades to be in a first state when the lens barrel is collapsed such that the shutter blades are opened and at least part of at least one of the optical lenses is inserted in the opening of the unit base member; and controlling, when the lens barrel is projected from the main body of the image pickup device, the shutter blades to be on standby in a second state such that the shutter blades are moved to be partially closed so as to be opened by a smaller amount than in the first state, and then controlling the shutter blades to further close from the second state in reply to an instruction for starting a picture taking operation.

* * * * *